United States Patent [19]

Mann et al.

[11] Patent Number: 4,684,786

[45] Date of Patent: Aug. 4, 1987

[54] ELECTRICALLY HEATED FUEL PICK-UP ASSEMBLY FOR VEHICLE FUEL TANKS

[75] Inventors: Joseph M. Mann; James A. Spitler, both of Fort Wayne, Ind.

[73] Assignee: Navistar International Corporation, Chicago, Ill.

[21] Appl. No.: 636,648

[22] Filed: Aug. 1, 1984

[51] Int. Cl.[4] .................. H05B 3/00; F24H 1/10; F02M 31/12; B67D 5/62

[52] U.S. Cl. .................. 219/297; 137/341; 219/205; 219/299; 219/301; 222/146.5; 123/549; 123/557

[58] Field of Search ........... 219/296, 299, 300, 301, 219/214, 205–207; 137/341; 222/146.5; 239/133, 135; 123/549, 557

[56] References Cited

U.S. PATENT DOCUMENTS

| | | | |
|---|---|---|---|
| 942,894 | 12/1909 | Farren et al. | 219/301 X |
| 1,457,634 | 6/1923 | Neri | 222/146.5 |
| 1,634,704 | 7/1927 | Brand | 219/301 X |
| 1,729,777 | 10/1929 | Hargreaves | 219/296 X |
| 1,892,197 | 12/1932 | Zerwer | 126/343.5 A |
| 1,929,231 | 10/1933 | Yirava | 222/146.5 X |
| 2,224,403 | 12/1940 | Limes | 219/300 |
| 2,507,902 | 5/1950 | Graves | 219/301 X |
| 2,745,572 | 5/1956 | Talbott | 222/146.5 X |
| 2,793,279 | 5/1957 | Kaiser | 219/296 X |
| 2,802,520 | 8/1957 | Trabilcy | 137/341 X |
| 4,372,279 | 2/1983 | Parks | 219/205 X |
| 4,534,408 | 8/1985 | Thibonnet | 123/557 X |

FOREIGN PATENT DOCUMENTS

| | | | |
|---|---|---|---|
| 2606113 | 8/1977 | Fed. Rep. of Germany | 219/205 |
| 602426 | 12/1925 | France | 219/296 |
| 747674 | 4/1933 | France | 219/301 |

*Primary Examiner*—Anthony Bartis
*Attorney, Agent, or Firm*—F. David AuBuchon; Dennis K. Sullivan

[57] ABSTRACT

An electrically heated fuel pick-up assembly insertable into a motor vehicle fuel tank for defrosting and dewaxing the fuel therein at the fuel pick-up point includes an inner tube substantially coextensive with and disposed within an outer tube in spaced relationship thereto to define therewith a fuel flow passage therebetween. The inner and outer tubes are immersed within the fuel tank and are supported by a base member attached to one end of the outer tube. A flexible PTC resistance strip heater of the type which automatically adjusts its heat output in response to fuel temperature is spirally disposed along the entire length of the passage on ribs secured to the inner tube for heating the fuel flowing through the passage from a fuel inlet in the end of the inner tube opposite the base member to a fuel outelt in the cap member communicating with an engine fuel supply line.

8 Claims, 4 Drawing Figures

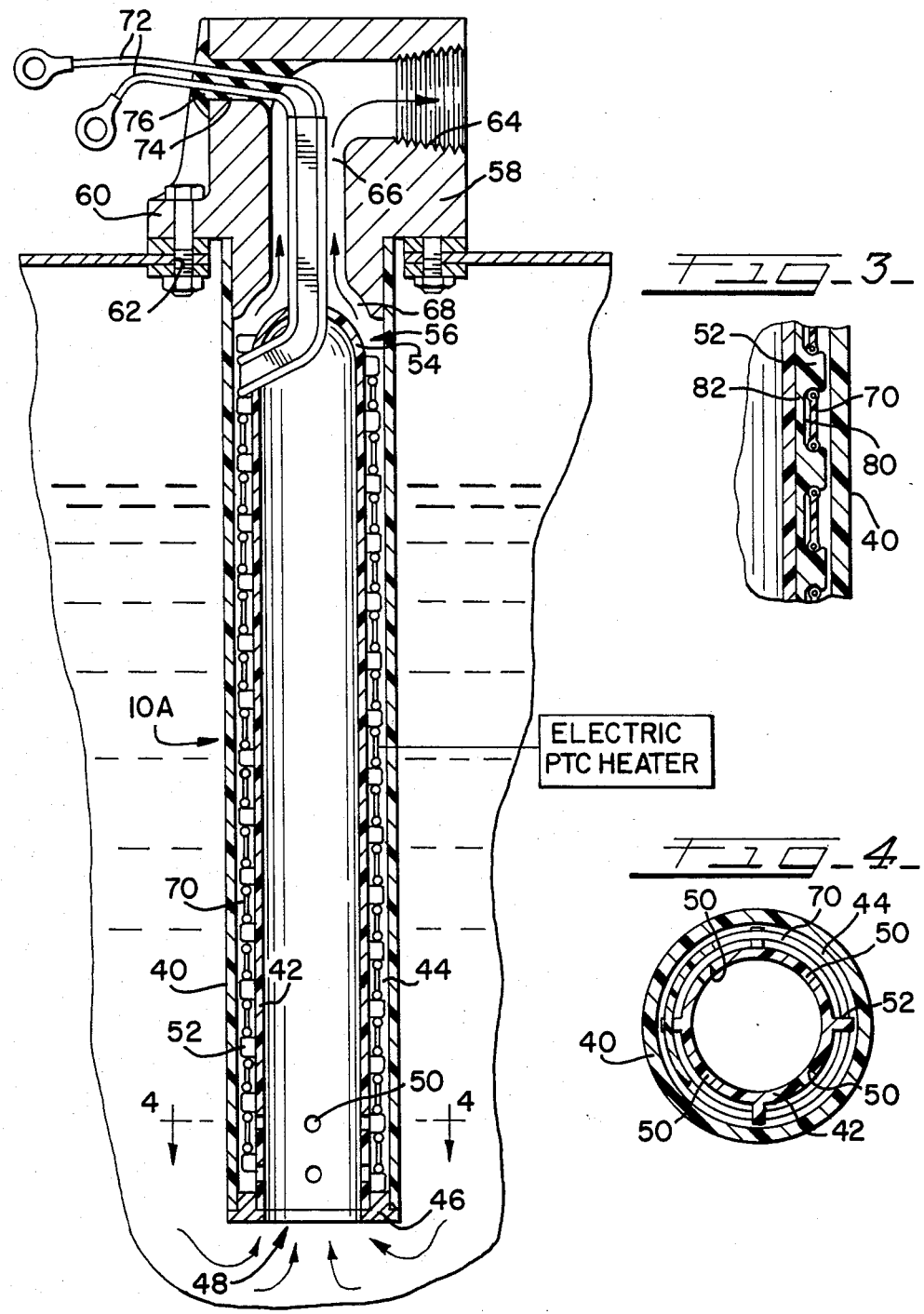

4,684,786

ELECTRICALLY HEATED FUEL PICK-UP ASSEMBLY FOR VEHICLE FUEL TANKS

BACKGROUND OF THE INVENTION

1. Field of the Invention

This invention pertains to fuel heaters and more particulary to a fuel heater located in an entry end of the fuel supply line immersed in a fuel tank.

2. Information Disclosure Statement

Heretofore, the fuel heaters for heating fuel coming from a fuel tank to a vehicle engine were incorporated within the fuel supply lines, or made integral with the filter, or formed as hose heaters, and so forth. Contemporary fuel heaters use return fuel, engine coolant, exhaust gases and electrical heat elements for heating the fuel.

In view of the industry's and vehicle operators' trend to use lower grade fuels, which have higher temperature cloud points, there is an increasing need to heat the fuel to enhance engine starting and to guard aganist wax buildup in fuel filters.

Some fuel heaters are built with gaskets, seals O-rings and so forth, i.e., parts that require replacement or repair. The subject fuel heater is virtually maintenance-free and constructed to run year round without shut-off valves, drain cocks, solenoids, etc. to maintain or service. The heater does not require a disassembly in hot weather. The simplicity of the heater structure and its operation should lead to less downtime and better fuel mileage. The subject heater is completely self-contained when installed in a fuel tank and can operate as long as there is fuel in a fuel tank and battery power is sufficient to energize a heating element therein.

None of the existing fuel heaters describes or teaches the novel fuel pick-up heater as described hereinbelow.

SUMMARY OF THE INVENTION

The subject invention provides for a fuel heater means insertable into a motor vehicle fuel tank for a fuel pickup and warm-up in an entry end of an engine fuel supply line. A first embodiment of the heater comprises a first tubular member located within the second tubular member, both of which being immersible in the fuel. A heating element is disposed between the first and second tubular members. The fuel passes through the first member, warms up by the heating element and exits into the supply line. Preferably, an electric heating element is spirally disposed between the tubular members, and the lower end of the assembly sealed by a cap while a fuel resistant insulating material is disposed about the exterior of the outer tube.

In a second embodiment, the heating element comprises a flexible PTC strip heater, of the type which automatically adjusts its heat output in response to fuel temperature, spirally disposed in ribs secured to the inner tube while the fuel is preferably communicated through the lower portion of the inner tube to the space between the tubes wherein the fuel rises within the outer tube alongside the heating element until it exits from the outer tube into the supply line.

BRIEF DESCRIPTION OF THE DRAWINGS

FIG. 2 is a cross-sectional view of a heater assembly in its second embodiment;

FIG. 3 is a blown-up cross-sectional view of the heater assembly fragment of the embodiment of FIG. 2; and FIG. 4 is a cross-sectional view of the heater assembly taken substantially along the lines 4—4 in FIG. 2.

DESCRIPTION OF THE FIRST EMBODIMENT

Figure 1:
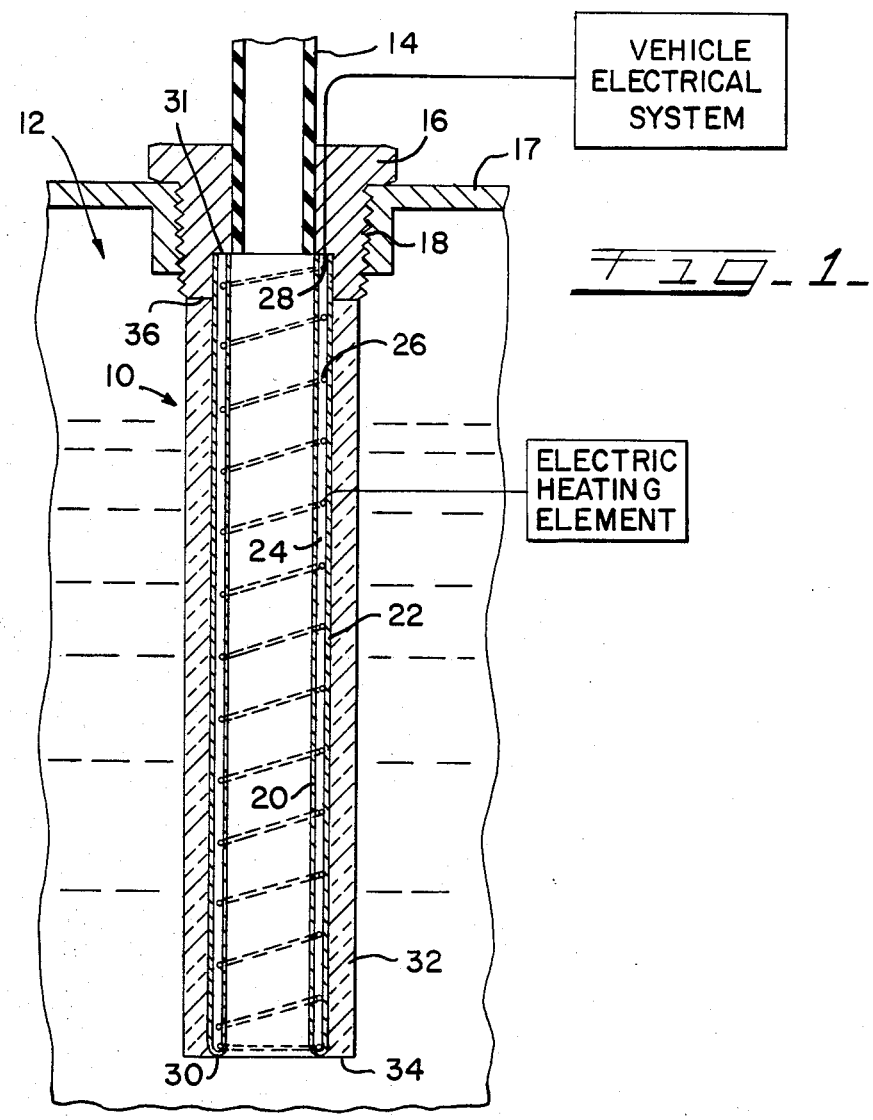
FIG. 1 is a partially cross-sectional view of the fuel heater assembly in its first embodiment.

Referring now to the drawings wherein reference characters designate like or corresponding parts throughout the complete view, there is shown in FIG. 1 a fuel heater assembly 10, installed in a motor vehicle fuel tank 12. The fuel heater assembly 10 is connected with a fuel supply line 14 by virtue of a connecting fitting 16 threadably engageable with the fuel tank wall 17 at 18 or any other mechanical means. The fuel heater assembly 10 comprises an inner cylinder 20 coaxially located within and coextensive with the outer cylinder 22. The space or gap 24 between the cylinders 18 and 20 is filled with a heating coil 26 connected with a motor vehicle electrical system at 28. The gap 24 is closed at the bottom by the cap 30 and the top by the fitting 16. The outer cylinder 22 is enclosed by a diesel fuel resistant insulation 32 being coextensive with the cap 30 at its bottom end 34 and abutting the fitting 16 at 36. The upper end 31 of the cylinders 20 and 22 is tapped by the fitting 16.

The subject fuel heater is insertably mounted in the motor vehicle fuel tank. The bottom end of the heater is a tip of the fuel supply line. The fuel moves into the vehicle engine through the heater inner cylinder being immersed into the fuel. The heated fuel passes through the pump toward the fuel injectors. Water in the warm fuel tank settles to the bottom where it can be drained periodically. The fuel heater can operate on 12 or 24 volt from an on-board vehicle electrical system. A thermostatic control (not shown in the drawings) would enable the automatic maintenance of the fuel temperature thereby minimizing an energy consumption. An on-off switch located anywhere in the electrical power line would allow a manual switch-off system if necessary.

DESCRIPTION OF THE SECOND EMBODIMENT

The heater assembly in its second embodiment 10A shown in FIG. 2 comprises an outer cylinder 40 coaxially enclosing the inner cylinder 42. The space 44 between the cylinders 42 and 40 is closed by a T-shaped ring 46 covering the fuel heater edge 48. The inner fuel cylinder 42 is perforated by a plurality of symmetrically and equidistantly spaced holes 50 located at the heater entry end 48. A support rib 52 spirally encircles the inner fuel cylinder 42 and is rigidly attached thereto. The inner cylinder 42 ends with a dome cap at the heater exit end 56. The spiral rib 52 equidistantly spans the distance between the dome cap 54 and the ring 46 within the gap 44.

The outer fuel cylinder 40 is secured to and depends from the connecting fitting 58, which is attached to the fuel tank wall 17 by the mounting flanges 60 and bolts coming through the holes 62 in the flange 60. The connecting fitting 58 interconnects the heater assembly 10A with the fuel supply line projecting through the opening 64. The passage 66 communicates with the channel 68 leading to the gap 44 and with the opening 64.

The spiral rib 52 supports a thermal tape 70. The tape 70 represents a heater comprising a conductive polymeric core extruded between two parallel copper bus wires. Electrical current flows through the core between conductors, thus generating heat. As the temperature rises, the electrical resistance of the core material increases, reducing current flow and decreasing heat output. This infinitely reversible process occurs independently at each point along the heater strip and prevents overheating. The heater strip 70 beginning at the heater entry end 48 and exiting from the spiral rib support at the heater exit end 56 extends into the passage 66. The heater strip bus wires 72 extending through the opening 74 in the fitting 58 are hooked up to a vehicle battery terminal. The wire opening 74 is sealed by a molded sealer 76.

As illustrated in FIG. 3, the heater strip 70 is placed in cavities 80 spaning the distance between the ribs 52. The ribs 52 can be interconnected by a lining 82, if necessary.

As shown in FIG. 4, the ribs 52 can radially extend from the inner cylinder 42 thereby equidistantly supporting the heater strips 70 in the recesses or openings therein (not shown) in the vertical ribs 52.

In operation, the fuel from the fuel tank is picked up through the heater entry end 48 and moved into the fuel inner cylinder 42. The fuel passes through the openings 50 into the gap 44 between the inner and outer cylinders. The inner cylinder functions essentially as a supporting structure for a spiral rib 52 carrying the heater strip 70. The fuel rises through the gap 44 and absorbs heat generated by the heater strip 70. The warmed up fuel exists from the heater assembly 10 through the channel 68, passage 66 and opening 64 into the fuel supply line.

The outer and inner fuel cylinders or tubes are made of a fuel resistant material, such as nylon. The heater strip is controlled by a switch installed in the dash board panel in a motor vehicle cab. By preheating the fuel entering the fuel supply line the subject heater, being immersed into the fuel tank, permits fast idling to warm the engine and eliminates stalling due to wax buildup during an engine operation. The heater strip 70, such as commercially available heaters Thermolimit or Racor Thermoline of Raychem Company, as a resistance feeding element having a positive temperature coefficient (PTC) of resistance and continuously adjust their heat output in response to variations in temperature without controls. The heater strip is flexible and can be crossed over itself or spriralled without risk of burnout. The heater strip automatically increases heat output when surrounding temerature drops and decreases output when the temperature rises. Use of the heater strip eliminates necessity of fragile resistance wires, thermostats and requires no external control.

One of the most important advantages of the subject heater is the heater's ability to melt ice at the fuel line pickup point which heretofore no other heater was able to do. This should greatly improve the efficiency of the fuel supply to the engine, as the supply line is free from ice obstruction. The heater accelerates an engine start-up and guards against wax buildup in fuel filters.

While two embodiments of the invention have been illustrated and described herein, various changes and modifications may be made therein without departing from the spirit of the invention as defined by the scope of the apended claims.

What is claimed is:

1. A fuel heater assembly immersible into a motor vehicle fuel tank for warming fuel passing therethrough and comprising:

a first tubular member coaxially located within a second tubular member in spaced relation thereto to define a flow path therebetween and interconnected therewith at one end thereof by an annular cap element, said tubular members being substantially coextensive;

said first tubular member having a fuel inlet at said one end, the other end being closed, and a plurality of holes in the immediate vicinity of said annular element and communicating with the space between said tubular members;

an electric heating element disposed in said space between said tubular members and adapted to be connected with an associated vehicle electrical source, said heating element being supported by a plurality of ribs secured to said first tubular element;

the other end of said second tubular member being closed by a connecting fitting having a passage adapted to be connected to a vehicle fuel supply, said passage communicating with said space between said tubular members.

2. The invention according to claim 1, and said ribs spirally encircling said first tubular member.

3. The invention according to claim 1, and said heating element comprising a flexible strip continuously self-adjusting its heat output in response to variations in fuel temperature.

4. The invention according to claim 1, and said heating element exiting from said space between the tubular members into said passage.

5. The invention according to claim 1, and said fitting being adapted to be attached to a fuel tank.

6. The invention according to claim 1, and said ribs equidistantly extending radially and outwardly from said first tubular element.

7. In combination with a motor vehicle fuel tank and with an associated engine fuel supply line, a fuel heater assembly comprising:

a base member attached to said fuel tank;

an outer tubular member connected at one end to said base member and having its other end disposed within said fuel tank;

an inner tubular member substantially coextensive with said outer tubular member disposed within said outer tubular member in spaced relationship thereto and being operatively interconnected therewith into an assembly defining a fuel flow passage therebetween having a fuel inlet at said other end and a fuel outlet communicating with said base member;

said base member having means for establishing fuel communication between said fuel outlet and said engine fuel supply line; and a heating element disposed between said inner and outer tubular members and extending substantially along the entire length of said flow passage.

8. A fuel heater assembly immersible into a motor vehicle fuel tank for warming fuel passing therethrough and comprising:

a base member adapted to be attached to a fuel tank, said base member having passage means adapted to establish fuel communication with an engine fuel supply line;

an outer tubular member attached at one end to said base member;

an inner tubular member substantially coextensive with said outer tubular member disposed within said outer tubular member in spaced relationship thereto and defining therewith a fuel path therebetween fluidly communicating at said one end of said outer tubular member with said passage means of said base member, said fuel path having a fuel inlet adjacent the end of said outer tubular member opposite said one end; and a heating element disposed between said inner and outer tubular member in said fuel path and extending substantially the entire length thereof.

* * * * *